Feb. 5, 1935.  G. B. WATKINS  1,989,959
LAMINATED GLASS
Filed Oct. 17, 1929
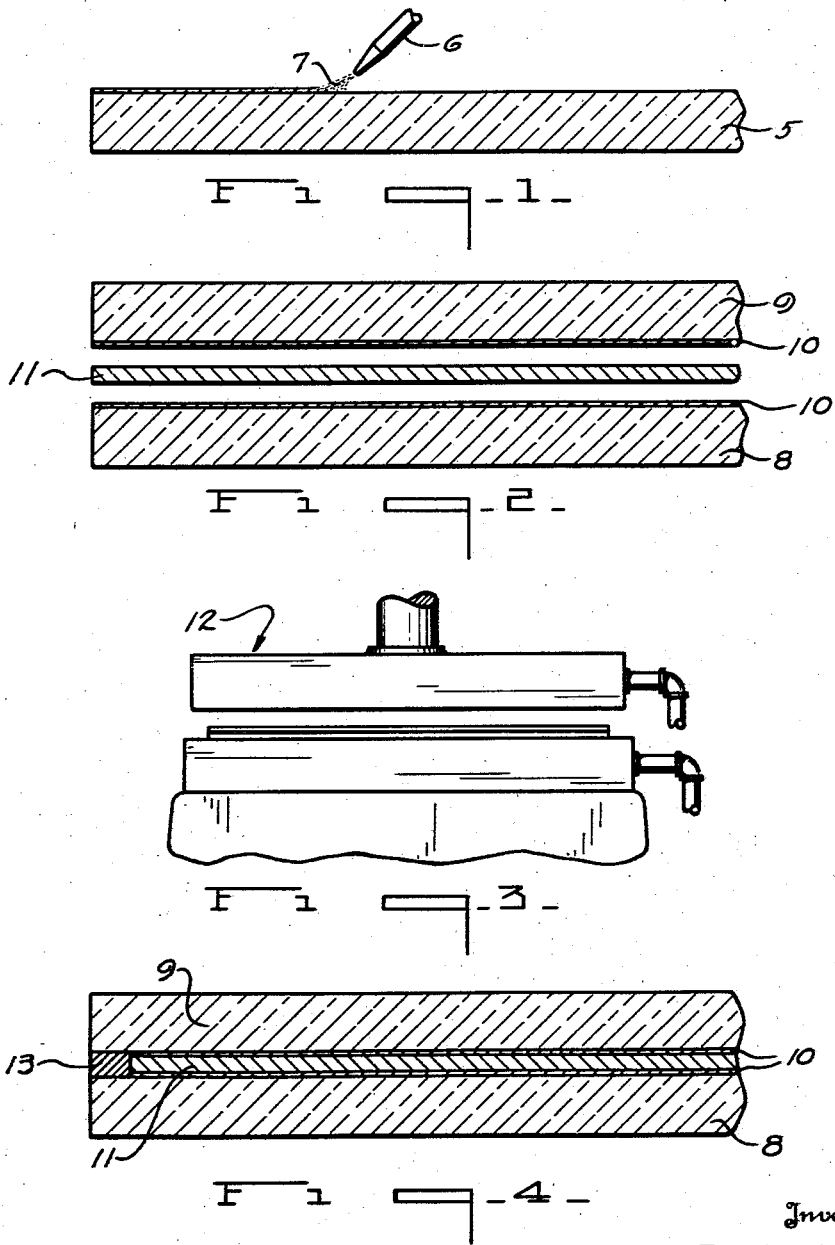
Inventor
George B. Watkins
By Frank Fraser
Attorney Patented Feb. 5, 1935

1,989,959

UNITED STATES PATENT OFFICE 1,989,959

LAMINATED GLASS

George B. Watkins, Toledo, Ohio, assignor to Libbey-Owens-Ford Glass Company, Toledo, Ohio, a corporation of Ohio Application October 17, 1929, Serial No. 400,429

2 Claims. (Cl. 49—81)

The present invention relates to an improved process of producing as a new article of manufacture, a sheet of laminated glass.

The expression "laminated glass" is used to designate a composite structure comprising two or more sheets of glass and one or more sheets of non-brittle material. Obviously, the value of such a composite sheet is dependent to a considerable degree upon the adequacy and permanency of the bond between the various laminations. Another important item is that of absence of dirt between the laminations.

The present invention contemplates the use of a liquid or liquid mixture adapted to serve in the capacity of a bond inducing medium between the laminations, the liquid having a sufficiently high boiling point and low vapor pressure that the finished product will not bubble when in actual use. The liquid is applied to the laminations in such a way that the tendency toward the introduction of dirt between the laminations is reduced to a minimum.

Stated broadly, laminated glass is produced in accordance with this invention by following out a process wherein a liquid or a liquid mixture, which is novel in itself, is sprayed directly upon one surface of each of the two sheets of glass to be assembled, which glass surfaces have been previously cleaned. An untreated non-brittle membrane is then interposed between the liquid coated surfaces of the glass sheets and the sandwich thus formed subjected to the combined action of heat and pressure whereby to produce a finished composite structure.

Other objects and advantages of the invention will become more apparent during the course of the following description when taken in connection with the accompanying drawing.

In the drawing wherein like numerals are employed to designate like parts throughout the same, Fig. 1 is a diagrammatic view showing a sheet of glass in section illustrating the application of the liquid to one surface of a sheet of glass, Fig. 2 is a diagrammatic view in section illustrating the laminations after they have been properly treated and ready for pressing, the laminations being shown in spaced relation for the purpose of clearness, Fig. 3 is a diagrammatic representation of a form of press that may be used, and Fig. 4 is a fragmentary sectional view of a finished sheet of laminated glass.

In Fig. 1, the numeral 5 designates a sheet of glass one of whose surfaces at least has been properly cleaned. A spray gun or other suitable implement 6 is used to spray a film of liquid 7 upon the clean surface of the glass.

The liquid mixture which I prefer consists of 30% dibutyl phthalate, 40% monoethyl ether of diethylene glycol, and 30% diethylene glycol, with 2% by weight of nitro-cellulose dissolved therein. This liquid mixture is sprayed upon one surface each of two sheets of glass such as the sheets 8 and 9 in Fig. 2, each of which is illustrated as being provided with a film of the liquid 10.

An untreated non-brittle membrane such as a sheet of pyroxylin plastic 11 is interposed between the liquid coated surfaces of the glass sheets 8 and 9 to produce, as is known in the art, a sandwich. The expression "untreated pyroxylin plastic" is used to designate such a sheet which is not provided with a coating or film of any bond inducing medium, cement, skin coat, or the like. Of course, this expression does not exclude proper seasoning of the celluloid, etc.

The sandwich is then placed in a press, designated in its entirety by the numeral 12, where it is subjected to the combined action of heat and pressure to produce a composite structure. In Fig. 4 is illustrated the finished sheet which is provided with a seal 13 for protecting the bond between the laminations.

It is a decided advantage not to have to spray or treat the pyroxylin plastic sheet preliminary to assembling from the standpoint of dirt hazard. Where a sheet of pyroxylin plastic is sprayed with a solvent or mixture of solvents, it becomes sticky before it is assembled between the glass sheets and therefore picks up considerable dirt. Any dirt picked up in this manner is, of course, permanently positioned in the laminated sheet.

Large quantities of glass have been made up by following the above process and using the liquid mixture mentioned, and it has been found that such glass has a consistently good bond and is relatively free of dirt.

An important part of the invention is the inclusion of the nitro-cellulose in the liquid mixture. Although it is possible to spray a solution mixture on the glass sheets in the manner set forth without the nitro-cellulose, the amount of liquid necessary to obtain a good bond often causes excess pitting of the pyroxylin plastic sheet surfaces, producing what is commonly called in the art an orange peel effect. By incorporating the nitro-cellulose into the liquid mixture, the activity of the solvent mixture is reduced so that a sufficient quantity of the mixture can be sprayed upon the glass to give a good consistent bond and at the same time will not produce excess pitting to the extent that the orange peel effect will be noticed in the finished sheet.

The amount of nitro-cellulose included in the mixture is determined somewhat upon the ability to spray the mixture. The addition of an excessive amount of nitro-cellulose will make the mixture too viscous, causing trouble in the spraying of the mixture upon the glass sheets. Although nitro-cellulose varies, I have found in the main that anything in excess of 5% nitro-cellulose gives a mixture which is too viscous. On the other hand, it has been found that 2% nitro-cellulose gives a very satisfactory mixture from both the standpoint of ability to spray and elimination of the tendency toward the orange peel effect. Obviously, however, the use of exactly 2% is not absolute as variations can be made one way or another depending upon the particular ingredients being used.

I claim:

1. The process of producing laminated glass, consisting in spraying a mixture of dibutyl phthalate, monoethyl ether of diethylene glycol, diethylene glycol, and nitro-cellulose on one surface each of two sheets of glass, interposing a non-brittle membrane between the liquid coated glass surfaces, and then subjecting the sandwich thus formed to the combined action of heat and pressure to produce a composite structure.

2. As a new article of manufacture, a sheet of laminated glass including two sheets of glass and a sheet of non-brittle material interposed between and bonded to the glass sheets to provide a unitary structure by means of a bond inducing medium consisting of a mixture of dibutyl phthalate, monethyl ether of diethylene glycol, diethylene glycol, and nitro-cellulose.

GEORGE B. WATKINS.